United States Patent [19]

Nearman et al.

[11] Patent Number: 4,461,176
[45] Date of Patent: Jul. 24, 1984

[54] MINIATURE GYROSCOPE

[75] Inventor: Gerald M. Nearman, Framingham, Lewis S. Bostwick, Andover, both of Mass.

[73] Assignee: Raytheon Company, Lexington, Mass.

[21] Appl. No.: 336,983

[22] Filed: Jan. 4, 1982

[51] Int. Cl.³ .............................................. G01C 19/42
[52] U.S. Cl. ..................................... 73/504; 74/5.6 E
[58] Field of Search ................. 73/504, 516 R, 517 B; 74/5.6 D, 5.6 E, 5.5; 318/651, 676

[56] References Cited

U.S. PATENT DOCUMENTS

| | | | |
|---|---|---|---|
| 2,959,252 | 11/1960 | Jamieson | 73/516 R |
| 3,188,540 | 6/1965 | Lautzenhiser | 74/5.6 D |
| 3,257,853 | 6/1966 | Schaberg | 74/5.5 |
| 3,882,731 | 5/1975 | Koning | 74/5.6 D |

Primary Examiner—James J. Gill
Attorney, Agent, or Firm—Philip J. McFarland; Joseph D. Pannone

[57] ABSTRACT

A miniature rate-integrating gyroscope is shown to comprise: an electrical motor (whose rotor, when rotating, constitutes a gyroscopic mass) mounted in a single degree of motion gimbal within a cylindrical case; a motion sensor to determine any rotation of such gimbal with respect to such case, such sensor including a transformer having a primary winding and a secondary winding movable with respect to each other so that the phase difference between alternating signals in the primary and secondary windings is analogous to such rotation; phase detecting circuitry to produce a control signal representative of such phase difference; a torque generator responsive to the control signal to null any rotation of such gimbal; and a fluid damper to critically damp any rotation of such gimbal.

1 Claim, 4 Drawing Figures

MINIATURE GYROSCOPE

BACKGROUND OF THE INVENTION

This invention pertains generally to gyroscopes and accelerometers and in particular to a miniature rate-integrating gyroscope for use in a guided missile where the size of such a gyroscope must be reduced to a minimum.

The seeker in many types of guided missiles is stabilized by gimbal mounted rate sensors or gyroscopes. Obviously, the smaller the missile, the less room is available for the required circuitry and apparatus. Unfortunately, however, the development of improved inertial sensors has not kept pace with advances made in other parts of guidance systems (such as the integrated circuitry); consequently, the volume, weight and inertia of the requisite gyroscopes adversely affect, or even limit, the performance of smaller guided missiles.

SUMMARY OF THE INVENTION

With this background of the invention in mind, it is therefore an object of this invention to provide a miniature rate-integrating gyroscope having performance superior to conventional rate gyroscopes, yet having one-fourth the volume of conventional rate gyroscopes.

It is another object of this invention to provide an accelerometer having volume and performance characteristics compatible with the contemplated miniature rate-integrating gyroscope.

The foregoing and other objects of this invention are generally attained by scaling down the size of a conventional rate gyroscope and, in lieu of a purely mechanical restraint mechanism, using an electromagnetically torqued restraint arrangement driving the gimbal to pickoff null, whereby sources of error inherent in mechanically restrained gyroscopes (such as pickoff thermal sensitivity, torsion bar hysteresis, noise and cross-coupling sensitivity) are eliminated with the result that the performance of the contemplated gyroscope (or accelerometer) is substantially equal to the performance of much larger gyroscopes (or accelerometers) of conventional construction.

BRIEF DESCRIPTION OF THE DRAWINGS

The aforementioned objects and other features of the invention are explained in the following description taken in connection with the accompanying drawings wherein.

DESCRIPTION OF THE PREFERRED EMBODIMENT

Figure 1:
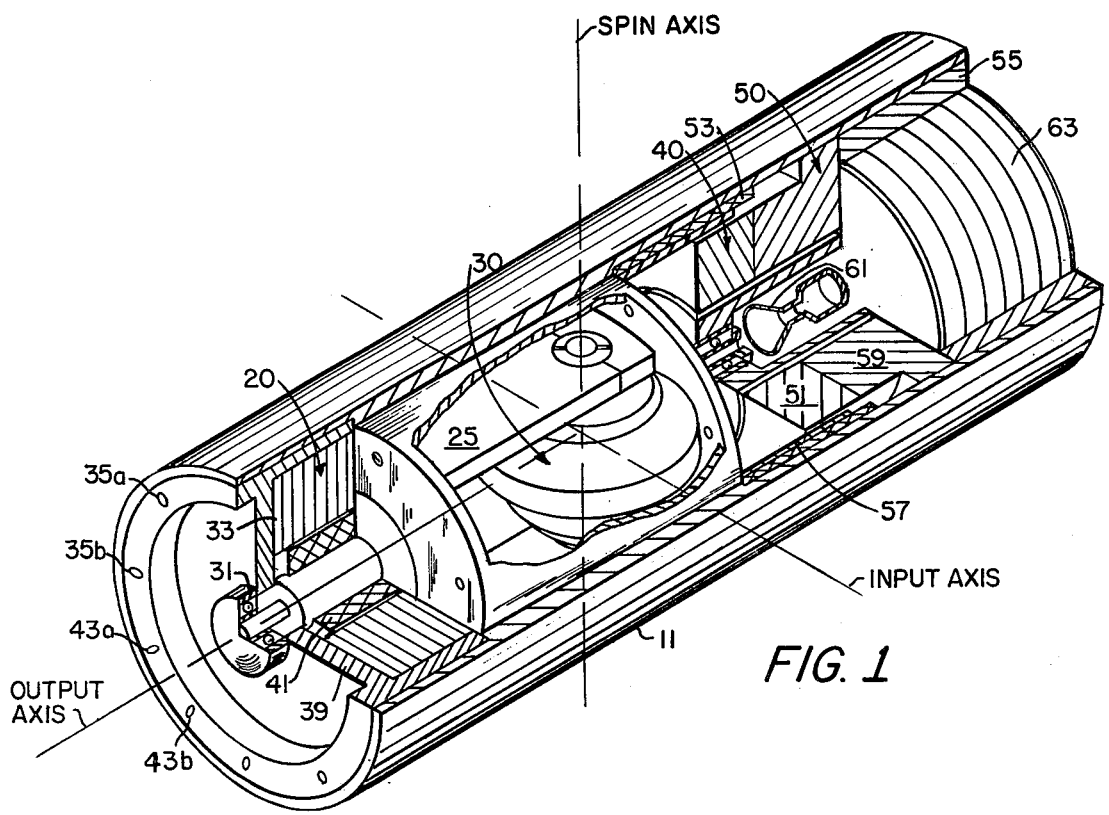
FIG. 1 is an isometric view, partially sectioned, of an inertial sensor with a rate-integrating gyroscope according to this invention.
Figure 1A:
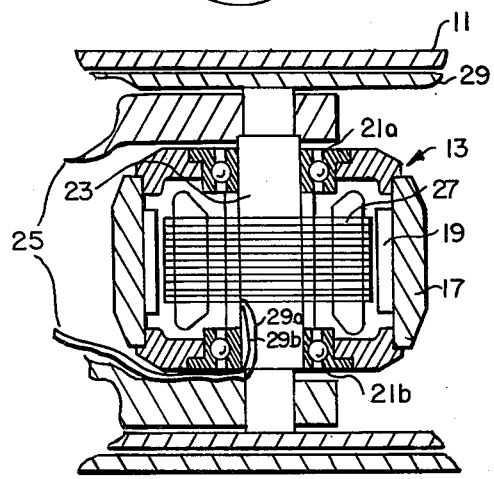
FIGS. 1A and 1B are cross-sectional views of, respectively, a gyroscope and an accelerometer according to this invention.
Figure 1B:
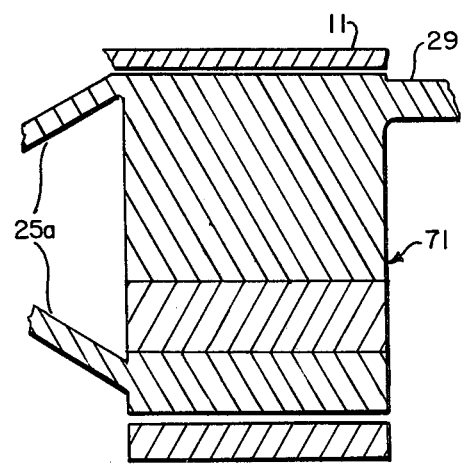

Referring now to FIG. 1, it may be seen that the contemplated gyroscope (or accelerometer) comprises a number of subassemblies mounted within a cylindrical case 11, that is, a signal generator 20, an inertial sensor 30, a torque generator (or torquer) 40 and a damper 50, disposed along the longitudinal axis of the cylindrical case 11 (which is here coincident with the output axis of the inertial sensor 30) to produce, in a manner to be described, an electrical signal analogous to any angular rate about the input axis of the inertial sensor 30. As indicated in FIGS. 1A and 1B, the inertial sensor 30 is either a gyroscope or an accelerometer. Thus, as shown in FIG. 1A, the inertial sensor 30 comprises a spin motor 13 (with its spin axis orthogonal to the longitudinal axis of the cylindrical case 11). The input axis then is the axis which is mutually orthogonal to the output axis and the spin axis. The rotor (not numbered) of the spin motor 13 functions as a gyroscopic mass, a ring 17 on which rotor magnets 19 are supported being fabricated from sintered tungsten material in order to obtain high inertia in a relatively small size. The rotor is mounted, by way of ball bearings 21a, 21b, on a shaft 23 that in turn is secured in a journal (not numbered) formed in a yoke 25. The shaft 23 also supports a stator winding 27 to which power is applied through wires 29a, 29b. Thus, when the stator winding 27 is energized, the rotor (not numbered) is rotated about the shaft 23 to form a gyroscopic mass. The outer surface of the yoke 25 is curved adjacent to the shaft 23 to conform with the shape of a cylindrical cup 29 rotatably mounted within the cylindrical case 11 and then tapered down (as shown in FIG. 1) to provide a shaft for a ball bearing 31 (FIG. 1). Both the yoke 25 and the cylindrical cup 29 are fabricated from the same kind of aluminum (ALCOA 2219T81) so that the two members may be welded together by means of a tungsten inert gas welding technique to form a fluid-tight enclosure for inertial sensor 30.

The signal generator 20 (which may be deemed to be an internally toothed stator of magnetic material bearing primary winding 41 and a secondary winding 33 similar to a six pole differential transformer) is mounted to an end plate 39. Primary leads 43a and 43b and secondary leads 35a and 35b are also connected to, but electrically insulated from, end plate 39. Inside the signal generator 20, and concentric with it, a toothed rotor of magnetic material is mounted on the shaft borne by ball bearing 31. An A.C. signal from a source (not shown) is applied through leads 43a, 43b to the primary winding 41. Any rotational motion of the enclosure of the inertial sensor 30, by causing rotation of the toothed rotor, causes a phase analogous signal at the secondary leads 35a and 35b. The phase analogous electrical signal relative to the A.C. signal applied to the primary winding 41 is proportional to the angular position of the shaft 23 relative to a reference. The A.C. voltage out of the signal generator 20 is amplified and then phase demodulated to derive a polarized D.C. control signal for the torque generator 40. As a result, then, any precessional movement of the gyroscopic mass may be opposed and the enclosure driven to a null position.

The torque generator 40 here may be deemed to be a four-pole D.C. electric motor with four permanent magnets (such as magnet 51) serving as the stator and four coils (such as coils 53) serving as the rotor. The permanent magnets are mounted on flats (not numbered) equally spaced about the outside of a projection ring 55 having a diameter equal to the inside diameter of the cylindrical case 11. The coils 53 are mounted on the outside of a nonmagnetic sleeve 57 into which the four permanent magnets may be fitted. The nonmagnetic sleeve 57 is affixed to the cylindrical cup 29 which has four bosses (such as bosses 59) projecting therefrom to mesh with the four permanent magnets. The four coils are connected in series so that the current flows in adjacent legs are in the same direction when leads not numbered are actuated during operation. A ball bearing not numbered, centrally disposed of the permanent magnets 51 and the coils 53, as shown, allows the requisite rotational movement. In this connection, it will be noted that rotational movement is limited. That is, the intermeshing of the bosses 59 and the permanent magnets 51 permits only a small angular movement of the coils 53 relative to the permanent magnets 51; in operation, however, only a small angular movement is ever required to obtain any desired restoring torque.

It will also be recognized that any angular movement of the coils 53 relative to the permanent magnets 51 should be damped to eliminate overshoot due either to the precessional movement of the gyroscopic mass in the inertial sensor 30 or operation of the torque generator 40 and to allow the apparatus to integrate input forces. The concepts disclosed in the pending U.S. patent application Ser. No. 788,175, filed Apr. 18, 1978, and assigned to the same assignee as the present application, are here used to accomplish the desired damping and to maintain a substantially constant damping coefficient over a relatively large range of ambient temperatures. Briefly, then, a damping fluid (such as any known low viscosity silicone fluid whose viscosity remains relatively constant with temperature change) is introduced to fill, except for the volume within the cylindrical cup 29 and the yoke 25, the inside of the cylindrical case 11. Channels, not shown, are formed in the ring 55 so that, during operation, damping fluid may be forced from the spaces ahead of the advancing sides of the bosses 59 and passed, through a metering orifice (not numbered), to the spaces behind the trailing sides of the bosses 59. The metering orifice is formed by a tapered piston 61 whose position is controlled by a bellows 63.

Referring now to FIG. 1B, it may be seen that the disclosed rate integrating gyroscope may be easily converted to an accelerometer by substituting a pendulum 71 for inertial sensor 30 in the cylindrical case 11. No other element shown in FIG. 1 need be changed.

Figure 2:
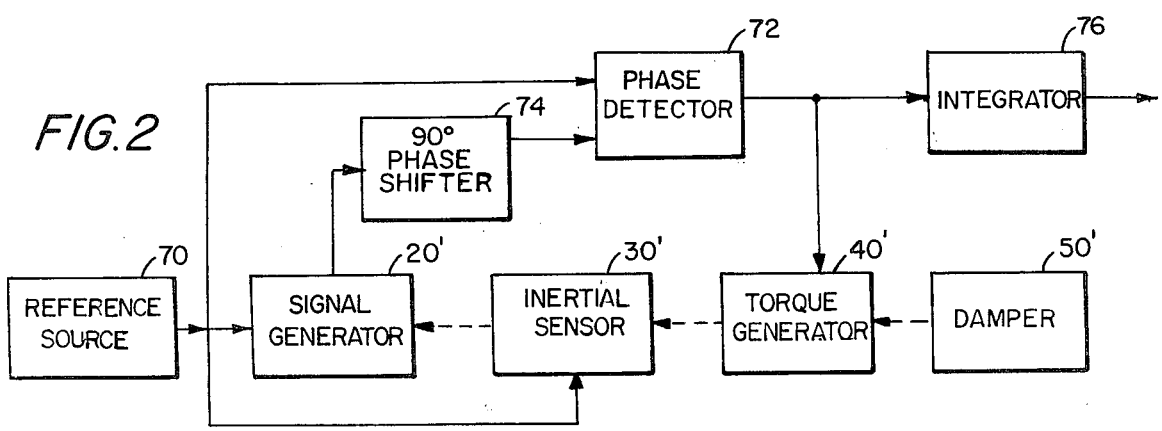
FIG. 2 is a block diagram of control circuitry for the inertial sensor of FIG. 1.

Referring now to FIG. 2 wherein subassemblies corresponding to those shown in FIG. 1 are designated by numerals with associate primes, it may be seen that the contemplated control system is a closed loop system. Thus, a reference source 70, i.e. a source of A.C. power, is actuated to apply power to the inertial sensor 30 (when the gyroscopic embodiment is implemented) and to the primary winding in the signal generator 20' and a reference signal to a phase detector 72. The second input signal to the phase detector 72 is the signal out of the secondary winding of the signal generator 20' (after such signal has been shifted in phase by 90° in a phase shifter 74). The signal out of the phase detector 72, which signal is a bipolar D.C. signal analogous to the precessional movement of the inertial sensor 30', results in rotational force (damped by damper 50') being applied around the output axis so as to counterbalance the force applied around the input axis. Such bipolar D.C. signal, after integration in an integrator 76, is passed to a utilization device, say an autopilot (not shown). It will now be observed that, even in the presence of mechanical errors, leakage or other error-inducing conditions, the closed loop arrangement just described operates accurately.

Having described a preferred embodiment of this invention, it will now be clear that changes may be made without departing from the inventive concepts. It is felt, therefore, that this invention should not be restricted to its disclosed embodiment, but rather should be limited only by the spirit and scope of the appended claims.

What is claimed is:

1. In a miniature rate-integrating gyroscope wherein a gyroscopic mass is mounted on a gimbal having a single degree of movement within a cylindrical case, the improvement comprising:
   (a) means for generating an alternating signal having a phase, relative to the phase of a reference signal, representative of any rotation of the gimbal within the cylindrical case and for shifting the phase of a reference signal, representative of any rotation of the gimbal within the cylindrical case and for shifting the phase of such alternating signal by 90°;
   (b) phase detector means, responsive to the phase-shifted alternating signal and the reference signal, for producing a bipolar control signal corresponding to the difference between the phases of the alternating and reference signals; and
   (c) torque generating means, responsive to the bipolar control signal and operative on the gimbal, for nulling any rotation of the gimbal, such torque generating means including:
      (i) a plurality of equally spaced permanent magnets fixed within the cylindrical case centrally thereof;
      (ii) a like plurality of serially-connected coils affixed to the gimbal, each one of such coils being in the field of one of the equally spaced permanent magnets; and
      (iii) means for connecting the bipolar control signal to the serially-connected coils to apply a torque to the gimbal to null the bipolar control signal.

* * * * *